United States Patent
Iwai et al.

(10) Patent No.: US 8,311,701 B2
(45) Date of Patent: Nov. 13, 2012

(54) HOOD POP-UP SYSTEM

(75) Inventors: Nobuhiro Iwai, Atsugi (JP); Toshihiro Yoshitake, Atsugi (JP); Yusuke Inomata, Ebina (JP); Kazuo Hoshino, Isehara (JP); Mitsuo Ehama, Kanagawa-ken (JP); Yasuhiro Miyata, Tokyo (JP)

(73) Assignee: Nissan Motor Co., Ltd., Yokohama-shi (JP)

( * ) Notice: Subject to any disclaimer, the term of this patent is extended or adjusted under 35 U.S.C. 154(b) by 1061 days.

(21) Appl. No.: 12/190,169

(22) Filed: Aug. 12, 2008

(65) Prior Publication Data

US 2009/0048734 A1 Feb. 19, 2009

(30) Foreign Application Priority Data

Aug. 14, 2007 (JP) ................................. 2007-211270

(51) Int. Cl.
*B62D 25/12* (2006.01)

(52) U.S. Cl. ........................ 701/36; 701/45; 180/69.23

(58) Field of Classification Search .................... 701/36, 701/45, 46; 180/69.21, 69.23, 274; 49/141, 49/325

See application file for complete search history.

(56) References Cited

U.S. PATENT DOCUMENTS

| | | | | |
|---|---|---|---|---|
| 5,303,631 A | * | 4/1994 | Frehaut et al. | 89/1.14 |
| 5,749,425 A | * | 5/1998 | Cudden | 180/69.2 |
| 6,257,657 B1 | * | 7/2001 | Sasaki | 296/187.09 |
| 6,345,679 B1 | * | 2/2002 | Sasaki | 180/274 |
| 6,860,356 B2 | * | 3/2005 | Peter | 180/274 |
| 7,044,256 B2 | * | 5/2006 | Lueders et al. | 180/274 |
| 7,303,040 B2 | * | 12/2007 | Green et al. | 180/274 |
| 7,686,120 B2 | * | 3/2010 | Browne et al. | 180/274 |
| 7,712,569 B2 | * | 5/2010 | Scheuch et al. | 180/274 |
| 7,934,293 B2 | * | 5/2011 | Kalargeros | 16/369 |
| 2003/0020284 A1 | | 1/2003 | Peter | |
| 2005/0179286 A1 | * | 8/2005 | Adachi | 296/193.11 |
| 2005/0257980 A1 | * | 11/2005 | Green et al. | 180/274 |
| 2006/0260855 A1 | * | 11/2006 | Yoshitake | 180/69.21 |

FOREIGN PATENT DOCUMENTS

| | | |
|---|---|---|
| CN | 1847060 A | 10/2006 |
| EP | 1 258 402 A2 | 11/2002 |
| EP | 1 712 426 A1 | 10/2006 |
| EP | 1 818 224 A1 | 8/2007 |
| JP | 10-194159 A | 7/1998 |
| JP | 11-198860 A | 7/1999 |
| JP | 2006-290230 A | 10/2006 |

OTHER PUBLICATIONS

Japanese Office Action and English Language Translation dated Jul. 3, 2012 (4 pages).

* cited by examiner

*Primary Examiner* — Paul N Dickson
*Assistant Examiner* — Timothy Wilhelm
(74) *Attorney, Agent, or Firm* — Foley & Lardner LLP

(57) ABSTRACT

A hood pop-up system for a vehicle that pops up a hood of the vehicle when detecting or predicting a collision of the vehicle. The hood pop-up system includes an oscillation-offsetting unit that offsets and reduces oscillation of the hood caused by the popping-up of the hood.

6 Claims, 13 Drawing Sheets

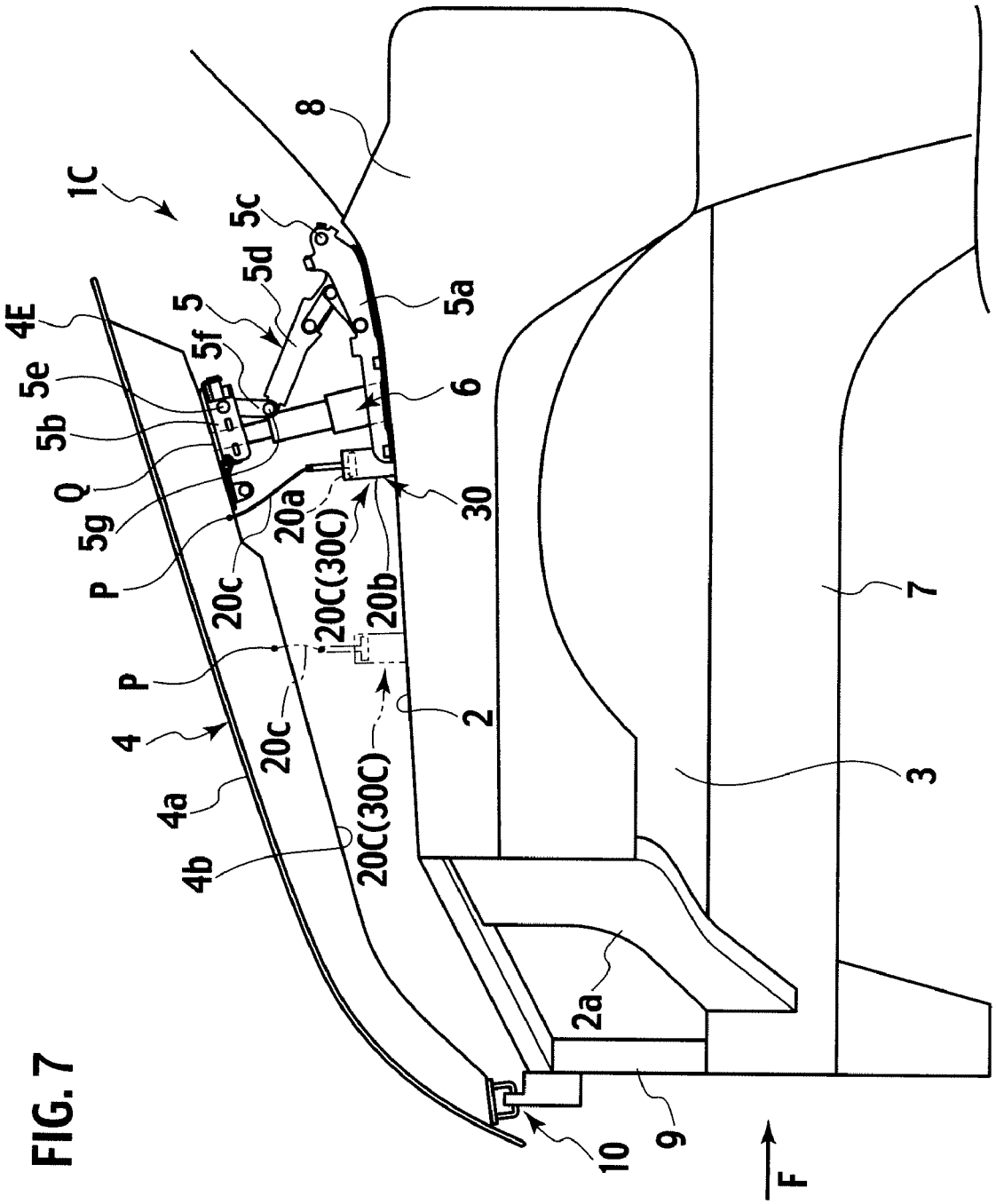

HOOD POP-UP SYSTEM

BACKGROUND OF THE INVENTION

1. Field of the Invention

The present invention relates to a hood pop-up system.

2. Description of the Related Art

In the event of a vehicle frontal collision, a hood pop-up system raises upwards (pops up) the hood of the engine compartment. Japanese Patent Application Laid-open Publication No. 11-198860 discloses such a hood pop-up system, in which a wire is provided to connect a rear-end portion of the hood to a vehicle body member. The wire bends the rear-end portion of the hood down to reduce the length of the backward protrusion of the hood, whereby the windshield glass gets broken less easily than otherwise, even when the front windshield glass is hit by the rear-end portion of the hood.

SUMMARY OF THE INVENTION

In a hood pop-up system such as one described above, the hood is popped up by activating an actuator. The popping-up of the hood sometimes causes oscillation of the hood.

In a case where such oscillation occurs, the displacement of the oscillating hood, the phase of the oscillation and other factors change the impact force given, to the hood, by the object that collides with the hood. To be more specific, suppose a case where a part of the oscillating hood is moving upwards when the object collides with the top surface of the part of the oscillating hood. In this case, the impact force given by the colliding object to the hood may possibly increase. By contrast, suppose another case where a part of the oscillating hood is moving downwards when the object collides with the top surface of the part of the oscillating hood. In this case, the space left between the hood and the structural assemblies positioned below the hood becomes smaller, and the hood may possibly collide with the structural assemblies. For this reason, a problem arises from the occurrence of such oscillation of hood. Specifically, the oscillation makes the designing of the hood into a complicated task.

What should be noted here is the fact that the above-described oscillation is unlikely to be suppressed by the simple provision of a wire between the vehicle body and the rear-end portion of the hood, such as the provision of the wire in the case of the technique disclosed in Japanese Patent Application Laid-open Publication No. 11-198860.

The present invention, therefore, aims to provide a hood pop-up system that is capable of offsetting effectively the oscillation of the popped-up hood.

An aspect of the present invention is to provide a hood pop-up system for a vehicle that pops up a hood of the vehicle when detecting or predicting a collision of the vehicle. The hood pop-up system includes an oscillation-offsetting unit which offsets and reduces oscillation of the hood caused by the popping-up of the hood.

BRIEF DESCRIPTION OF THE DRAWINGS

The invention will now be described with reference to the accompanying drawings wherein:

FIG. 7 is a side view (a partially sectional view) illustrating a popped-up hood in the front portion of a vehicle equipped with an oscillation-offsetting unit according to a second embodiment of the present invention.

DESCRIPTION OF PREFERRED EMBODIMENTS

Figure 1:
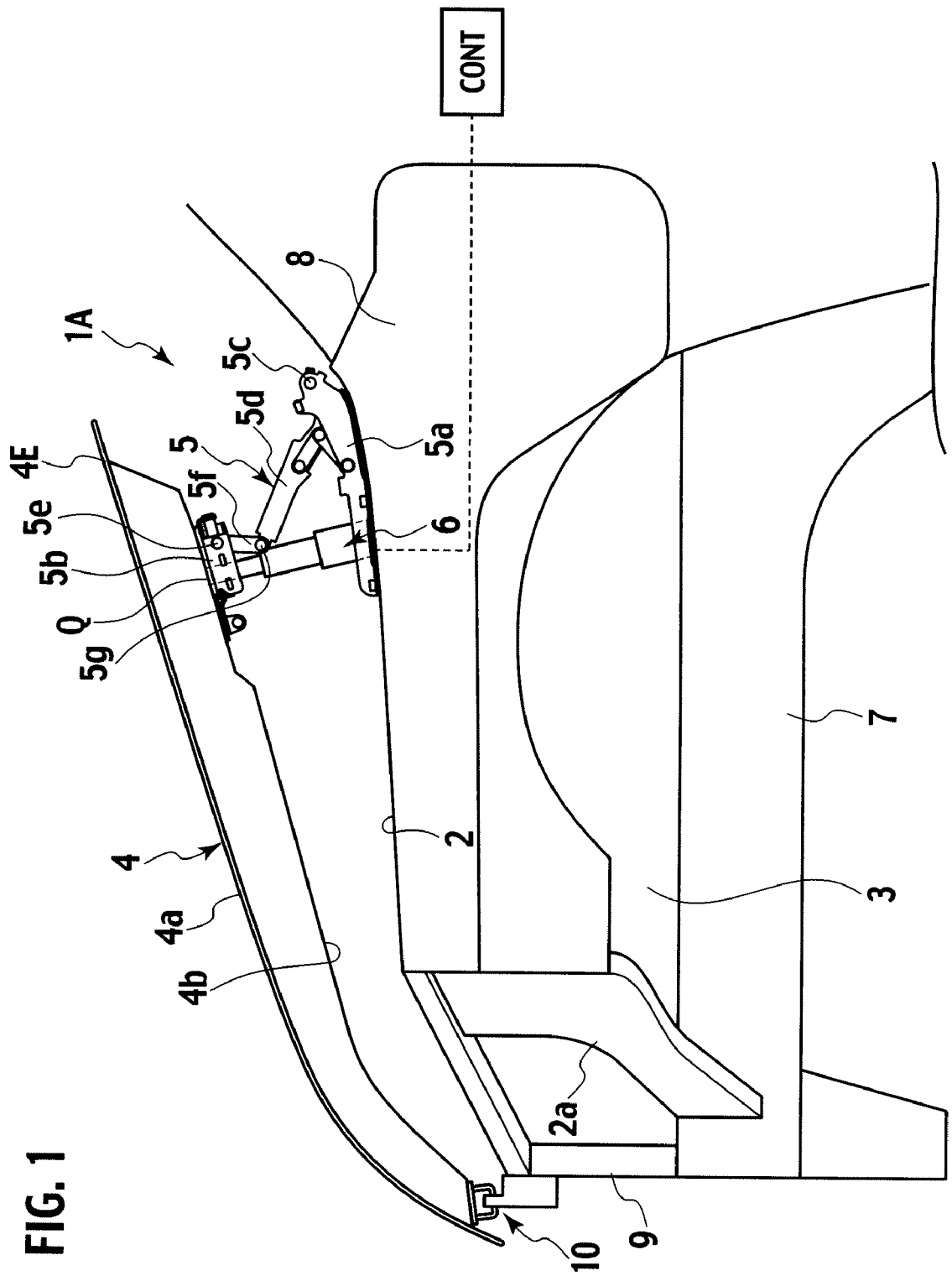
FIG. 1 is a side view (a partially sectional view) illustrating a popped-up hood in the front portion of a vehicle equipped with an oscillation-offsetting unit according to a first embodiment of the present invention.

Hereinafter, preferred embodiments of the present invention will be described in detail with reference to the drawings. Note that, apparatuses according to the following embodiments have the same constituent elements. Accordingly, these same constituent elements are denoted by the same reference numerals, and the descriptions thereof will be omitted.

First Embodiment

FIG. 1 illustrates a hood pop-up system 1A according to a first embodiment of the present invention. FIG. 1 is a side view (partially sectional view) of a popped-up hood 4 in the front portion of a vehicle.

As FIG. 1 shows, front side members 7 are disposed on the two sides, in the vehicle-width direction, of an engine compartment 3, respectively. The front side members 7 extend in the front-and-rear direction of the vehicle (in the right-and-left direction in FIG. 1). Hood ridge members 2 extend above the respective right and left front side members 7, and are parallel to each other. Dash side panels 8 are provided to cover the respective ones of the hood ridge members 2 from the outer sides in the vehicle-width direction. Linking members 2a are provided in the respective ones of the front-end portions of the hood ridge members 2. Each linking member 2a links the front-end portion of the hood ridge member 2 and the corresponding one of the front side members 7 on each side of the vehicle body. The front-end portions of the hood ridge members 2 are thus supported on the front side members 7 by the linking members 2a. A radiator core support 9 is disposed in the front part of the engine compartment 3. Though not illustrated, a radiator, a radiator fan, and other members are attached to the radiator core support 9.

A hood 4 is provided to open and close the upper opening of the engine compartment 3. The hood 4 has a double-layered structure including a hood outer panel 4a that forms the top surface of the hood 4 and a hood inner panel 4b that forms the lower surface thereof. In the central portion of the hood 4 in a horizontal direction, the two panels 4a and 4b together form a closed section. Meanwhile, in the peripheral portion of the hood 4, the two panels 4a and 4b are lapped over each other, and the hemmed peripheral portions of the two panels are bonded together (hem bonding).

The hood pop-up system 1A is disposed between a rear-end portion 4E of the hood 4 and the hood ridge members 2. The hood pop-up system 1A includes hood hinges 5 and actuators 6. Each of the actuators 6 includes an air cylinder. The actuators 6 are shortened in normal times (in a non-collision state), and are housed in the respective spaces formed between the closed hood 4 and the corresponding hood ridge members 2.

The hood hinges 5 are provided as a right and left pair so as to correspond to the right and the left hood ridge members 2. Each of the hood hinges 5 includes a vehicle-body-side attachment member 5a that is fixed onto the top surface of the corresponding one of the hood ridge members 2 and a hood-side attachment member 5b that is fixed onto the hood inner panel 4b. In addition, a lower link arm 5d is provided with a first one of its two ends connected to the vehicle-body-side attachment member 5a with a pin 5c, and the lower link arm 5d thus connected is capable of moving rotationally about the pin 5c. An upper link arm 5f is also provided with a first one of its two ends connected to the hood-side attachment member 5b with a pin 5e, and the upper link arm 5f thus connected is capable of moving rotationally about the pin 5e.

The second end of the lower link arm 5d is connected to the second end of the upper link arm 5f with a pin 5g, so that both the lower link arm 5d and the upper link arm 5f can move rotationally about the pin 5g. The lower link arm 5d and the upper link arm 5f are capable of being folded up or stretched out in a space between the vehicle-body-side attachment member 5a and the hood-side attachment member 5b.

In normal times (in a non-collision state), the lower link arm 5d and the upper link arm 5f are folded up, and the vehicle-body-side attachment member 5a and the hood-side attachment member 5b are proximate to each other. The hood 4 can move rotationally about the hood hinge 5, so that the front-end portion of the hood 4 can be opened and closed.

A hood lock 10 is disposed between the front-end portion of the hood 4 and the upper central portion of the radiator core support 9. Unlocking the hood lock 10 allows the front-end portion of the hood 4 to be opened.

At the moment of collision, however, the controller activates the actuator 6 on detecting or predicting the occurrence of a collision. The actuator 6 extends instantaneously to become the state as shown in FIG. 1. The extension of the actuator 6 is accompanied by the stretching-out of the lower link arm 5d and the upper link arm 5f of the hood hinge 5. As a consequence, the hood 4 is moved rotationally about the hood lock 10, and the rear-end portion of the hood 4 is popped up.

In this event, change in acceleration after the start of popping-up operation of the hood 4 (or the inertia of the hood 4) sometimes makes the hood 4 oscillate. The oscillation makes it difficult to design the impact resistance, durability, and the like of the hood 4. What is provided to address this problem in this embodiment is an oscillation-offsetting unit 20A that offsets and thus reduces the oscillation of the hood 4 caused by the popping-up of the hood 4. The mechanism of the oscillation-offsetting unit 20A to reduce the oscillation of the hood 4 is as follows. When the actuator 6 pops up the hood 4 from the vehicle body such as the hood ridge members 2, and the hood 4 is made to oscillate, the oscillation-offsetting unit 20A restricts the upward movement of the popped-up hood 4 relative to the vehicle body, so as to give the hood 4 offsetting oscillation that offsets and reduces the oscillation caused by the popping-up of the hood 4.

Figure 2A:
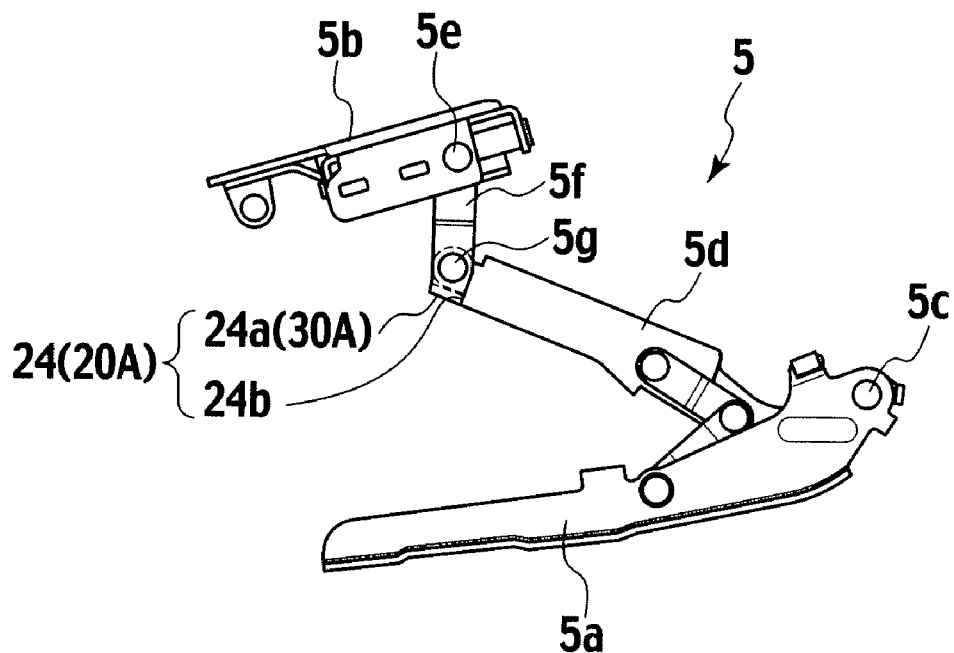
FIGS. 2A and 2B are side views of a hood hinge equipped with the oscillation-offsetting unit according to the first embodiment of the present invention.
Figure 2B:
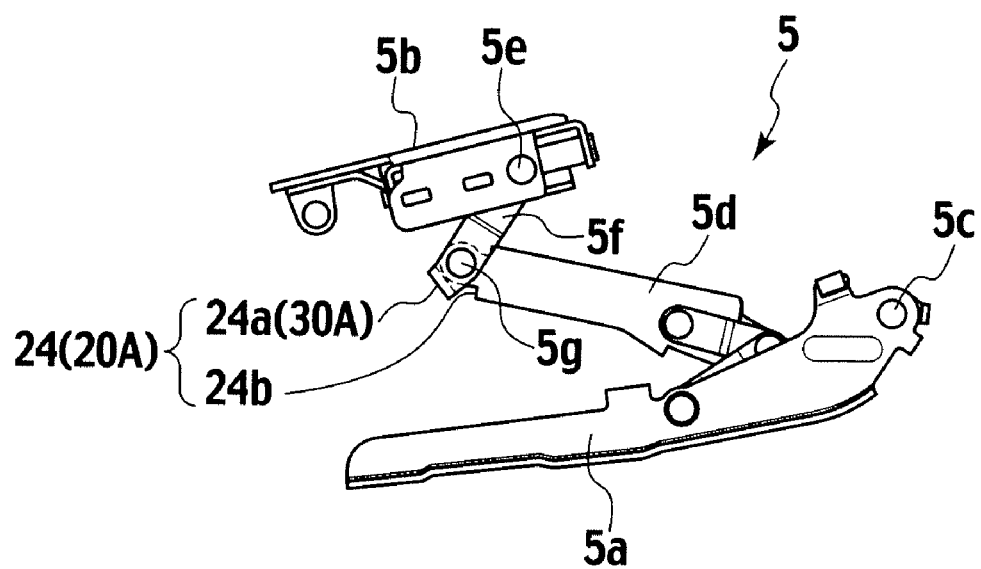
Figure 3:
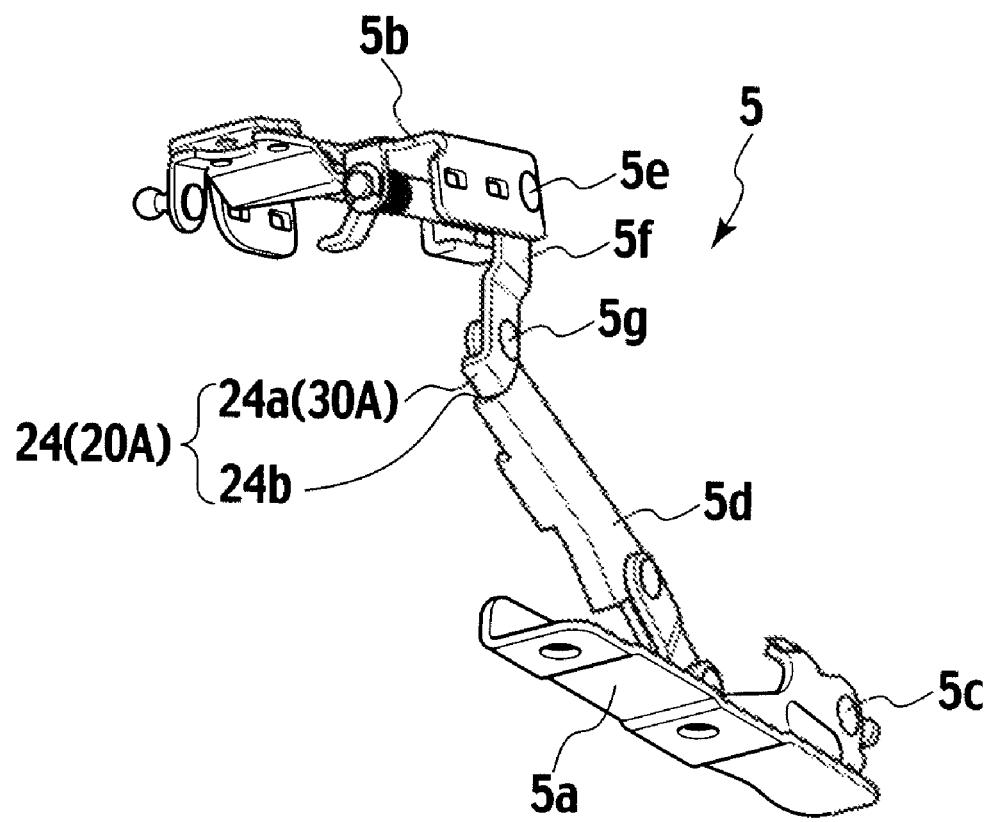
FIG. 3 is a perspective view, seen from the front side, of the stretched hood hinge equipped with the oscillation-offsetting unit according to the first embodiment of the present invention.

FIGS. 2A and 2B are side views of one of the identical hood hinges 5. The hood hinge 5 shown in FIG. 2A is in the stretched-out state. The hood hinge 5 shown in FIG. 2B is being stretched out. FIG. 3 is a perspective view illustrating the stretched-out hood hinge 5 when viewed from the front side thereof.

The hood hinge 5 according to this embodiment is provided with a stopper mechanism 24 that is disposed between the lower link arm 5d and the upper link arm 5f. The stopper mechanism 24 is used as the oscillation-offsetting unit 20A.

The stopper mechanism 24 is composed of a flange portion 24a and a stopper portion 24b. To form the flange portion 24a, a part of the leading-end portion of the upper link arm 5f—to be more specific, the part thereof that sticks out from the pin 5g—is folded inwards along the perimeter of the leading-end portion of the lower link arm 5d. The stopper portion 24b is formed in the perimeter of the lower link arm 5d. In the radial direction of the pin 5g, the position where the stopper portion 24b is formed is substantially the same as the position of the flange portion 24a. The stretching-out of the hood hinge 5 along with the popping-up of the hood 4 makes a side surface of the flange portion 24a abut on the stopper portion 24b. The abutting actually takes place, when the hood hinge 5 reaches the vicinity of its top dead center (hood-pop-up termination position) as shown in FIG. 2A and FIG. 3. This engagement between the flange portion 24a and the stopper portion 24b restricts the upward movement of the hood 4. The inertia of the hood 4 and a restricting force that is generated by the hood hinge 5 and is exerted on the hood 4 as a reaction to the inertia thereof, produce the offsetting oscillation on the hood 4.

At this time, the stopper mechanism 24 applies the restricting force to hood 4. The restricting force causes a displacement of the hood 4 in a direction opposite to the direction of the oscillation displacement of the oscillation caused by the popping-up of the hood 4. When the hood is at a hood pop-up position (i.e., a predetermined raised position of the popped up hood 4 with respect to the normal position of the hood 4 in normal times), and when the hood has an upward displacement in the oscillation caused by the popping-up of the hood 4, the stopper mechanism 24 applies the restricting force in a downward direction that is produced by restricting the upward movement of the popped-up hood 4. Accordingly, the stopper mechanism 24 serves as the oscillation-offsetting unit 20A in this embodiment.

Note that when the flange portion 24a is engaged with (abuts on) the stopper portion 24b, the flange portion 24 deforms. The deformation of the flange portion 24a allows the restricting force—and eventually the offsetting oscillation—to be adjusted. Accordingly, the flange portion 24a serves as a restricting-force adjustment mechanism 30A in this embodiment.

The offsetting of the oscillation of the hood 4 achieved by the oscillation-offsetting unit 20A will be described below with reference to FIGS. 5A to 5D and FIGS. 6A to 6C. Each of FIGS. 5A to 5D and FIGS. 6A to 6C illustrates how the oscillation of the hood 4 is offset and thus reduced by the interference with the offsetting oscillation in the direction opposite to the direction of the oscillation of the hood 4. In each graph, the application of the offsetting oscillation starts at the offsetting start time A. In each graph, the solid line represents the oscillation of the hood 4 caused by the popping-up of the hood 4 (this oscillation is referred to as the original oscillation). The broken line represents the offsetting oscillation produced by the oscillation-offsetting unit 20A (this oscillation is referred to as the offsetting oscillation). The thick solid line represents the composite oscillation or combined oscillation of the original oscillation and the offsetting oscillation. For the sake of simplicity, in all the cases that are to be examined in the following descriptions, the initial oscillation (the original oscillation) is assumed to be a simple harmonic oscillation with a sinusoidal waveform, and the amplitude and the period of the offsetting oscillation are assumed to be identical to those of the original oscillation.

Figure 5A:
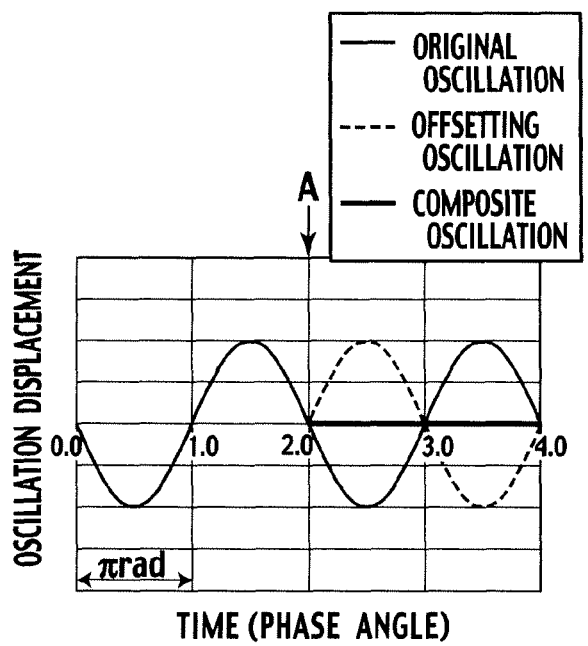
FIGS. 5A to 5D are schematic charts illustrating oscillating waveforms exhibiting oscillation offsetting effects by the oscillation-offsetting unit according to the first embodiment of the present invention. The examples shown respectively in FIGS. 5A to 5D differ from each other as to the points of time when the offsetting starts.

In the first case to be described, to offset and thus reduce the oscillation of the hood 4, the oscillation with the opposite direction to the direction of the original oscillation is given to the hood 4 when the phase angle $\phi$ of the oscillation caused by the popping-up of the hood 4 is equal to $2n\pi$ ($n=1, 2, \ldots$). In this case, as FIG. 5A shows, the original oscillation is offset and thus reduced to zero under ideal conditions. Accordingly, the optimal time to start the application of the offsetting oscillation with the opposite direction (the optimal offsetting start time A) is the points of time when the phase angle $\phi$ is $2n\pi$ ($n=1, 2, \ldots$).

Figure 5B:
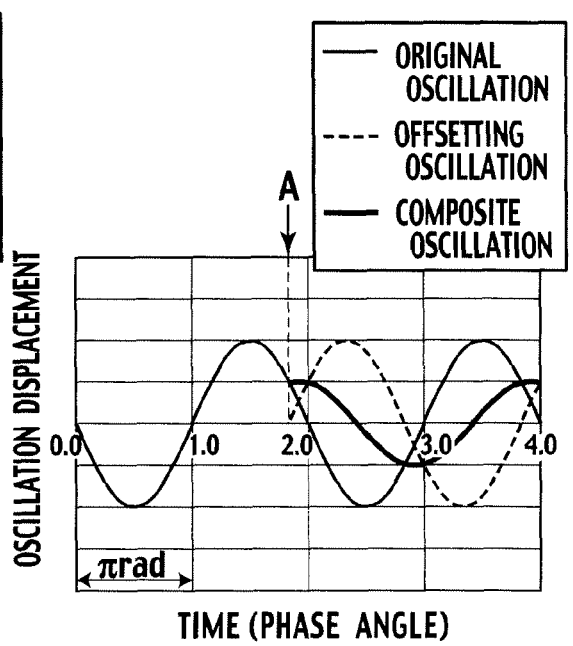
Figure 5C:
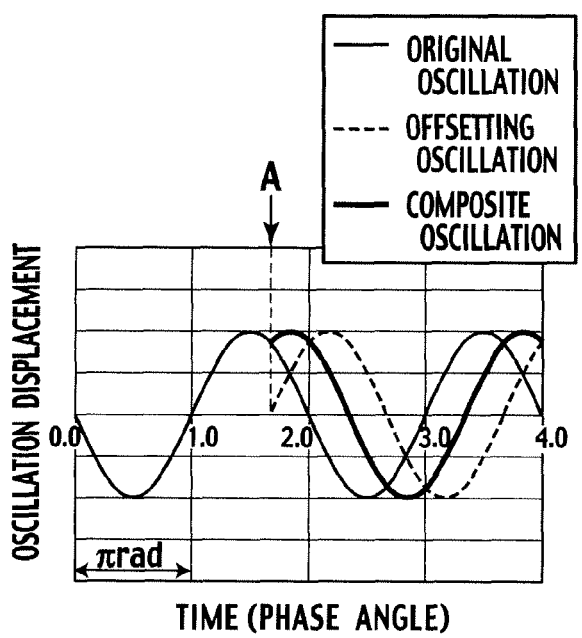
Figure 5D:
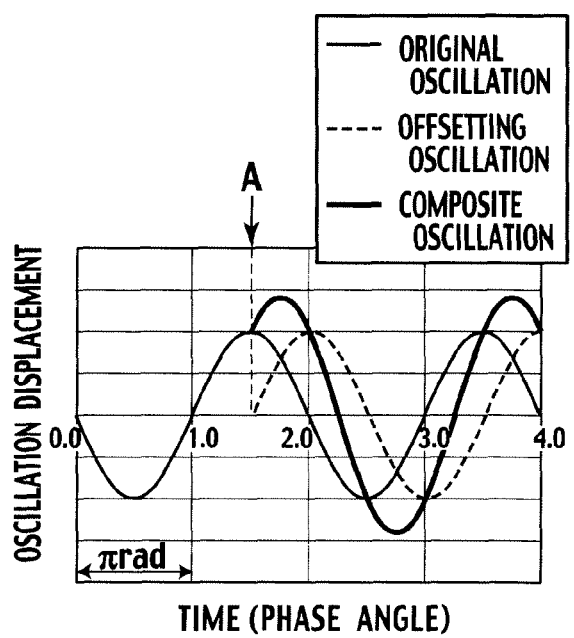

FIGS. 5B to 5D concern the cases where the offsetting start time A is made earlier than the offsetting start time A in the case of FIG. 5A. FIG. 5B shows the waveform of a case where the offsetting start time A is earlier by $\pi/6$ than $2n\pi$. That is, at the offsetting start time A in this case, the phase angle $\phi=2n\pi-\pi/6$. FIG. 5C shows the waveform of a case where the offsetting start time A is earlier by $\pi/3$ than $2n\pi$. That is, at the offsetting start time A in this case, the phase angle $\phi=2n\pi-\pi/3$. FIG. 5D shows the waveform of a case where the offsetting start time A is earlier by $\pi/2$ than $2n\pi$. That is, at the offsetting start time A in this case, the phase angle $\phi=2n\pi-\pi/2$. In the case where the phase angle $\phi$ at the offsetting start time A is equal to $2n\pi-\pi/3$ as shown in FIG. 5C, the amplitude of the composite oscillation is identical to the amplitude of the original oscillation. In the case as shown in FIG. 5D where the phase angle $\phi$ at the time of applying the offsetting oscillation is earlier than $2n\pi-\pi/3$, the amplitude of the composite oscillation becomes larger than the amplitude of the original oscillation. That is, no offsetting effect is observed. By contrast, in the case as shown in FIG. 5B where the phase angle $\phi$ at the time of applying the offsetting oscillation is later than $2n\pi-\pi/3$, the amplitude of the composite oscillation becomes smaller than the amplitude of the original oscillation. That is, a certain offsetting effect is observed.

Figure 6A:
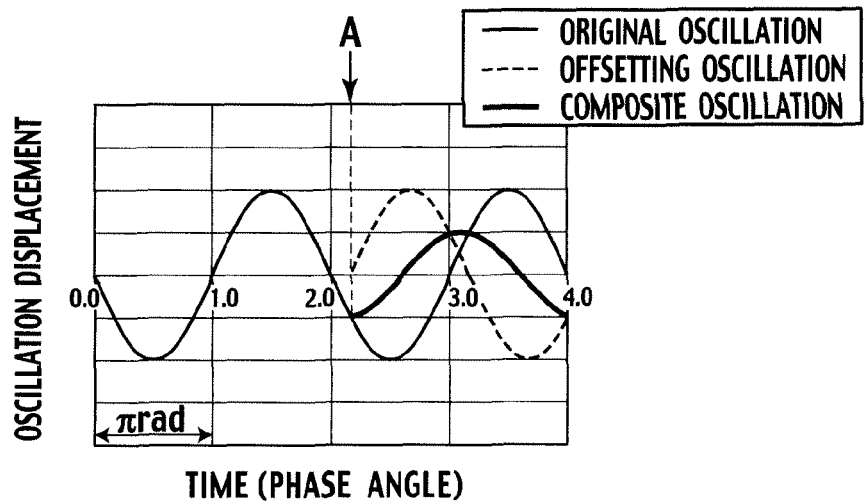
FIGS. 6A to 6C are schematic charts illustrating oscillating waveforms exhibiting oscillation offsetting effects by the oscillation-offsetting unit according to the first embodiment of the present invention. The examples shown respectively in FIGS. 6A to 6C differ from each other as to the points of time when the offsetting starts.
Figure 6B:
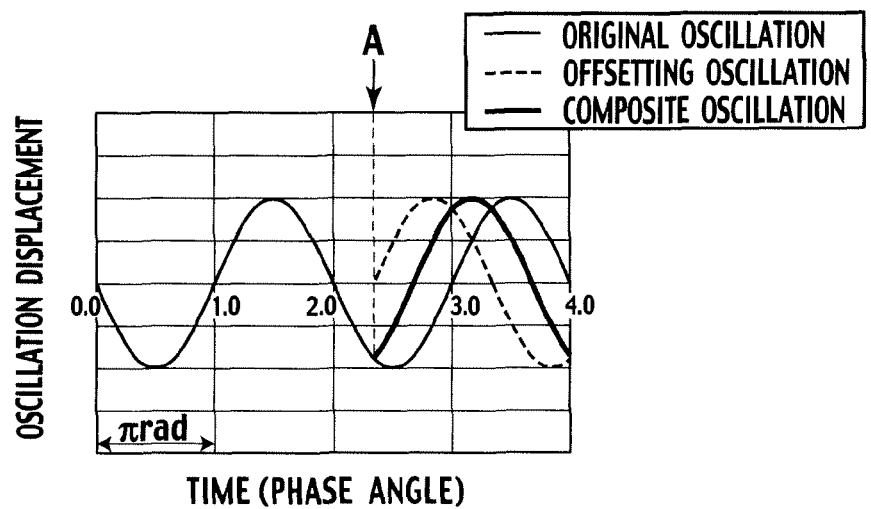
Figure 6C:
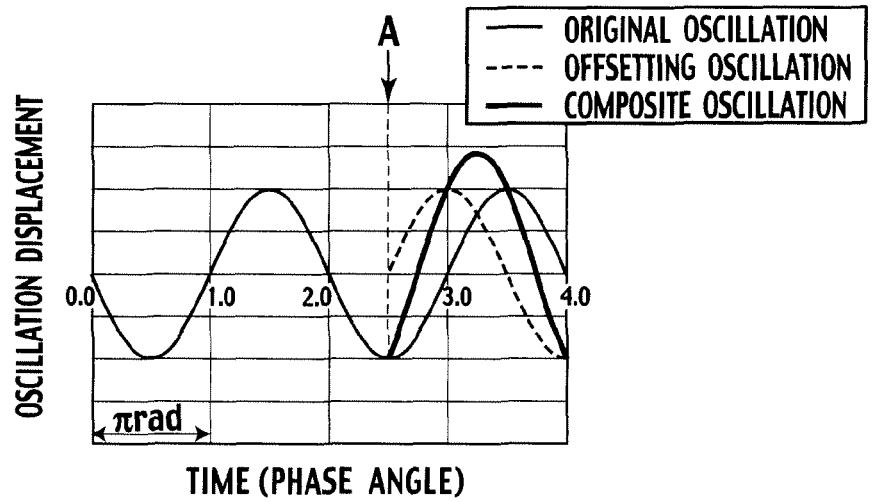

FIGS. 6A to 6C concern the cases where the offsetting start time A is made later than the offsetting start time A in the case of FIG. 5A. FIG. 6A shows the waveform of a case where the offsetting start time A is later by $\pi/6$ than $2n\pi$. That is, at the offsetting start time A in this case, the phase angle $\phi=2n\pi+\pi/6$. FIG. 6B shows the waveform of a case where the offsetting start time A is later by $\pi/3$ than $2n\pi$. That is, at the offsetting start time A in this case, the phase angle $\phi=2n\pi+\pi/3$. FIG. 6C shows the waveform of a case where the offsetting start time A is later by $\pi/2$ than $2n\pi$. That is, at the offsetting start time A in this case, the phase angle $\phi=2n\pi+\pi/2$. In the case where the phase angle $\phi$ at the offsetting start time A is equal to $2n\pi+\pi/3$ as shown in FIG. 6B, the amplitude of the composite oscillation is identical to the amplitude of the original oscillation. In the case as shown in FIG. 6C where the phase angle $\phi$ at the time of applying the offsetting oscillation is later than $2n\pi+\pi/3$, the amplitude of the composite oscillation becomes larger than the amplitude of the original oscillation. That is, no offsetting effect is observed. By contrast, in the case as shown in FIG. 6A where the phase angle $\phi$ at the time of applying the offsetting oscillation is earlier than $2n\pi+\pi/3$, the amplitude of the composite oscillation becomes smaller than the amplitude of the original oscillation. That is, a certain offsetting effect is observed.

What has been described above reveals the fact that a preferable time when the offsetting oscillation with the opposite direction is given to the hood 4 is, in terms of the phase angle $\phi$, later than $2n\pi$ minus $\pi/3$ and, at the same time, is earlier than $2n\pi$ plus $\pi/3$ (i.e., $2n\pi-\pi/3<\phi<2n\pi+\pi/3$).

A glance at the waveforms shown in FIGS. 5A to 5D and FIGS. 6A to 6C gives an easy understanding concerning how to use the restricting-force adjustment mechanism 30A for the purpose of achieving effective offsetting and reduction of the original oscillation. For this purpose, the original oscillation and the offsetting oscillation are made, by the restricting-force adjustment mechanism 30A, to have substantially the same absolute value of integral over a predetermined time interval (for example, an interval equivalent to one whole period of the oscillation) of oscillation displacement. Ideally, what is needed is to produce offsetting oscillation with a waveform that is substantially identical to the waveform of the original oscillation.

In this embodiment with the above-described configuration, when the hood 4 is popped up from the vehicle body by the actuator 6 (see, for example, FIG. 1), the oscillation of the hood 4 is caused by the popping-up of the hood 4. The oscillation thus produced is offset and thus reduced by offsetting oscillation that is produced and given to the hood 4 by the oscillation-offsetting unit 20A restricting, at the time of the popping-up, the movement of the hood 4 relative to the vehicle body. Taking advantage of this offsetting oscillation allows the original oscillation produced by the popping-up of the hood 4 to be offset and thus reduced effectively.

In addition, as in the case of this embodiment, the original oscillation of the hood 4 can be offset and thus reduced by the oscillation-offsetting unit 20A which applies a restricting force to the hood 4 that gives displacement in the direction opposite to the direction of the displacement of the original oscillation caused by the popping-up of the hood 4. In this case, what is necessary to offset and thus reduce effectively the original oscillation is the oscillation-offsetting unit 20A having a relatively simple structure.

In addition, as in the case of this embodiment, the oscillation-offsetting unit 20A produces the restricting force in the downward direction by restricting the upward movement of the popped-up hood 4 relative to the vehicle body. The oscillation-offsetting unit 20A applies the downward restricting force to the hood 4 positioned at the hood pop-up position, at the time when the hood 4 has an upward displacement in the original oscillation caused by the popping-up of the hood 4. In this case, what is necessary to offset and thus reduce effectively the original oscillation is the oscillation-offsetting unit 20A having a relatively simple structure.

In addition, as in the case of this embodiment, the hood hinge 5 can be provided with the oscillation-offsetting unit 20A and the restricting-force adjustment mechanism 30A. In this case, the configuration of the system as a whole can be made simpler and more compact in size. In addition, the production cost for the system can be reduced.

One thing that has to be noted is there are preferable timings for the oscillation-offsetting unit 20A to apply the offsetting oscillation with the opposite direction to the direction of the original oscillation of the hood 4 caused by the popping-up of the hood 4. The optimal time to give the offsetting oscillation to the hood 4 is when the phase angle $\phi$ of the original oscillation of the hood 4 is equal to $2n\pi$ ($n=1, 2, \ldots$). A preferable time for the same purpose is when the phase angle $\phi$ of the original oscillation of the hood 4 is later than $2n\pi$ minus $\pi/3$ and, at the same time, is earlier than $2n\pi$ plus $\pi/3$ (i.e., $2n\pi-\pi/3<\phi<2n\pi+\pi/3$). Effective offsetting and reduction of the original oscillation can be achieved in this way.

In addition, effective offsetting and reduction of the original oscillation can also be achieved by making the absolute value of the integral over a predetermined time interval of oscillation displacement of the offsetting oscillation to be substantially the same as the corresponding absolute value of the original oscillation caused by the popping-up of the hood 4.

Figure 4:
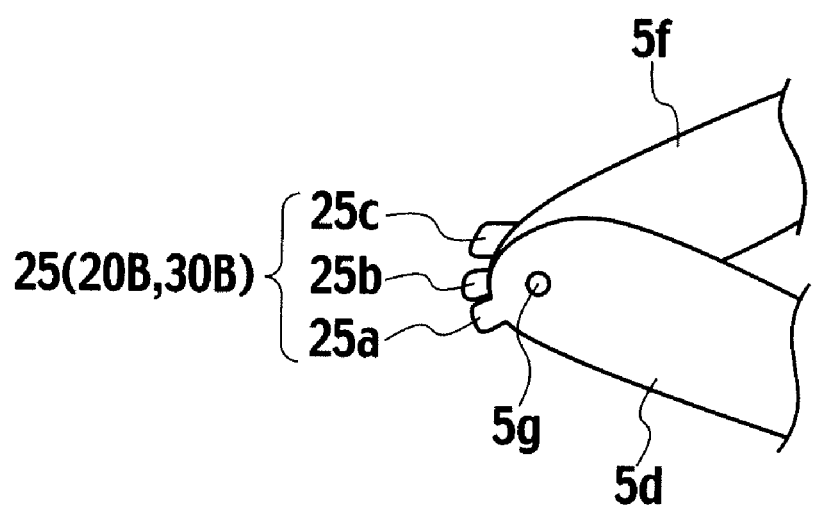
FIG. 4 is a partially enlarged side view of a hood hinge equipped with oscillation-offsetting unit according to a modified example of the first embodiment of the present invention.

A modified example of the first embodiment is shown in FIG. 4. FIG. 4 is an enlarged side view illustrating a modified example of the stopper mechanism 24 provided in the hood hinge 5. A stopper mechanism 25 according to this modified example includes two tongue-shaped pieces 25b and 25c arranged in line with each other on the perimeter of the leading-end portion of the upper link arm 5f (side by side with each other in the circumferential direction of the perimeter). In addition, a stopper portion 25a is formed on the perimeter of the leading-end portion of the lower link arm 5d. When the hood hinge 5 stretches out, the two tongue-shaped pieces 25b and 25c successively abut on the stopper portion 25a. Here, the tongue-shaped piece 25b, which abuts on the stopper portion 25a earlier than the tongue-shaped piece 25c does, is allowed to be plastically deformed by the abutting. The tongue-shaped piece 25c, which comes next, is designed to have a higher rigidity than that of the tongue-shaped piece 25b. The engagement of the rigid tongue-shaped piece 25c with the stopper portion 25a is the ultimate means for restricting the stretching-out of the hood hinge 5. To put it other way, in this modified example of this embodiment, the tongue-shaped piece 25b serves as a restricting-force adjustment mechanism 30B, and the stopper mechanism 25 serves as an oscillation-offsetting unit 20B.

As has been described above, also according to this modified example, the original oscillation produced when the hood 4 is popped up can be effectively offset and thus reduced by offsetting oscillation as in the case of the first embodiment. In addition, since the hood hinge 5 is provided with the oscillation-offsetting unit 20B and the restricting-force adjustment mechanism 30B, the configuration of the system as a whole can be simplified and be made compact in size. Moreover, the production cost for the system can be reduced.

Second Embodiment

FIG. 7 illustrates a hood pop-up system 1C according to a second embodiment of the present invention. An oscillation-offsetting unit 20C illustrated in FIG. 7 includes a wire 20c that is disposed to connect the hood 4 to the hood ridge member 2, which is a part of the vehicle body. Also included is a piston 20a to which an end of the wire 20 is fixed. The piston 20a is installed in a cylinder 20b, which is also included in the oscillation-offsetting unit 20C. The basic mechanism of the oscillation-offsetting unit 20C is as follows. The wire 20c is used to restrict the movement (the popping-up action) of the hood 4. The force exerted on the hood 4 by the wire 20c against the inertia of the hood 4 (the force is an impact force) is used to produce offsetting oscillation. For this reason, what is important to achieve the above-described purpose is the appropriate setting-up of the length of the wire 20c, of the position of the wire 20c, and of the location of the connecting point (the force application point) where the wire 20C is connected to the hood 4. The timing when the offsetting oscillation is given to the hood 4 (offsetting start time A) can be adjusted by changing the length of the wire 20c, for example.

The oscillation-offsetting unit 20C according to this second embodiment includes a restricting-force adjustment mechanism 30C that adjusts the restricting force given to the hood 4. To this end, the restricting-force adjustment mechanism 30C makes use of the viscous resistance of a fluid. To be more specific, a viscous fluid is filled in the cylinder 20b where the piston 20a is installed while the cylinder 20b is fixed onto the hood ridge member 2. In addition, the wire 20c is fixed to the piston 20a. Accordingly, a fluid drag acts on the hood 4 when the piston 20a moves (rises, in this second embodiment) inside the cylinder 20b. Use of such a restricting-force adjustment mechanism 30C allows appropriate adjustment for the shape of the temporal waveform of the offsetting oscillation (the rise of the waveform) and for the amplitude of the offsetting oscillation.

In addition, when the force application point P of the restricting force acting on the hood 4 is set within a region on the hood 4 having substantially the same phase of oscillation as the phase of oscillation in the vicinity of the contact point Q between the actuator 6 and the hood 4, the offsetting and reducing of the original oscillation can be more effective.

As has been described above, the oscillation-offsetting unit 20c of this second embodiment includes: the wire 20c connecting the hood 4 to the hood ridge member 2, which is a part of the vehicle body; the piston 20a to which an end of the wire 20c is fixed; and the cylinder 20b in which the piston 20a is installed. The basic mechanism of the oscillation-offsetting unit 20C uses the wire 20c to restrict the upward movement (the popping-up action) of the hood 4 relative to the vehicle body. The force exerted on the hood 4 by the wire 20c against the inertia of the hood 4 (the force is an impact force) produces the offsetting oscillation. Accordingly, the oscillation-offsetting unit 20C can be formed to have a relatively simple configuration.

In this second embodiment, the restricting force applied from the oscillation-offsetting unit 20C is made adjustable by making use of the resistance of the fluid, whereby the effective offsetting and reduction of the original oscillation can be achieved also in this second embodiment.

Third Embodiment

Figure 8:
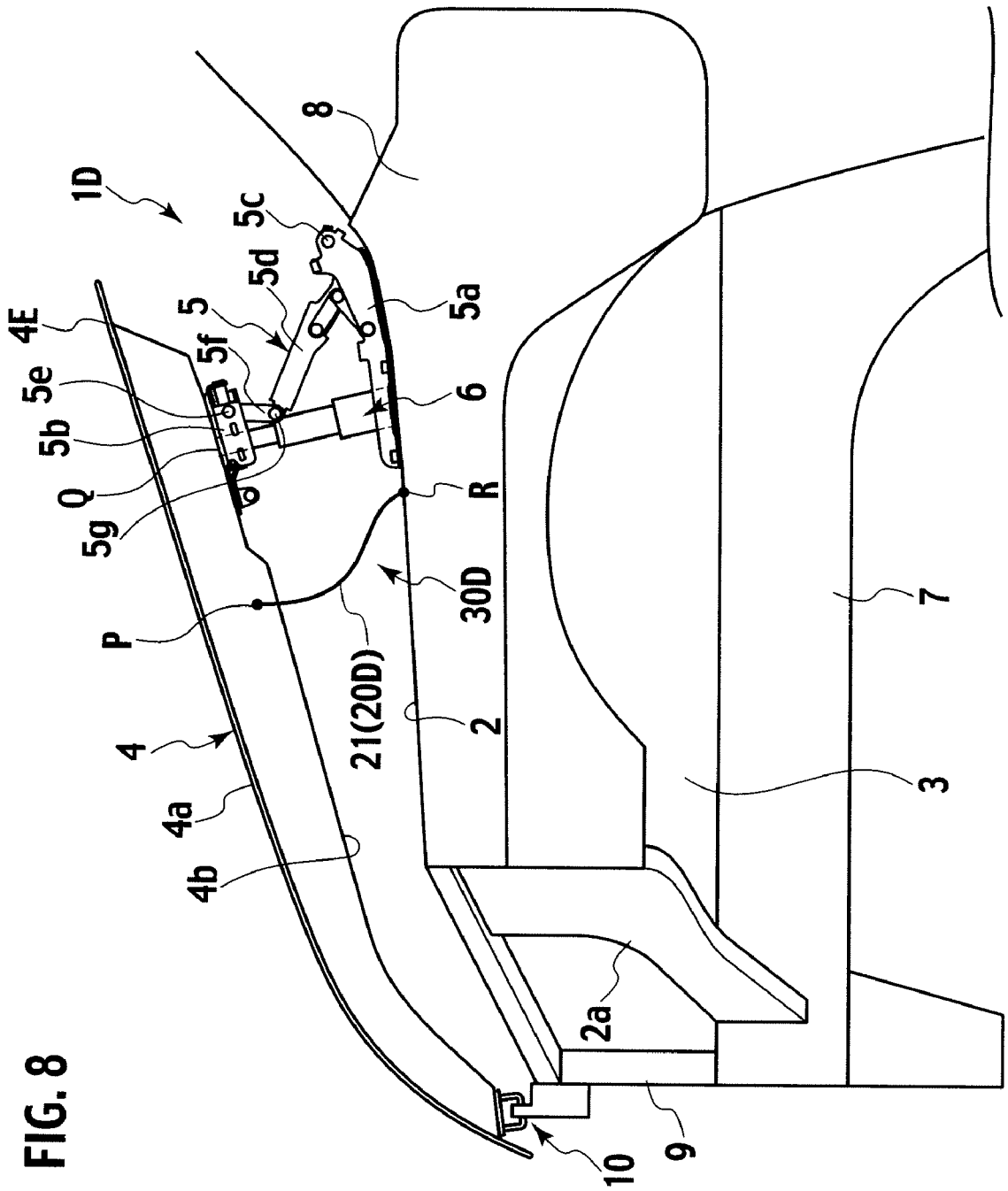
FIG. 8 is a side view (a partially sectional view) illustrating a popped-up hood in the front portion of a vehicle equipped with an oscillation-offsetting unit according to a third embodiment of the present invention.

FIG. 8 illustrates a third embodiment of the present invention. FIG. 8 is a side view (partially sectional view) of the popped-up hood 4 in the front portion of a vehicle.

In this third embodiment, the wire 21 is disposed to connect the hood ridge member 2 and the hood 4, so as to serve as an oscillation-offsetting unit 20D. To be more specific, the wire 21 connects a point P on the side of the hood 4 with another point R on the side of the hood ridge member 2. The wire 21 is designed to serve not only as the oscillation-offsetting unit 20D but also as a restricting-force adjustment mechanism 30D. This two-way use of the wire 21 distinguishes this third embodiment from the above-described second embodiment. To be more specific, while the wire 21 is deformable both elastically and plastically, the deformation of the wire 21 is used to adjust the absolute value of integral over a predetermined time interval of the oscillation displacement of the offsetting oscillation that is produced by the restriction exerted by the wire 21 on the movement of the hood 4. The absolute value of the integral of the offsetting oscillation is adjusted to be close to the corresponding absolute value of the integral of the oscillation displacement of the original oscillation of the hood 4.

As has been described above, according to this third embodiment, the original oscillation produced when the hood 4 is popped up can be effectively offset and thus reduced as in the case of the first and the second embodiments. In addition, since the wire 21 is used not only as the oscillation-offsetting unit 20D but also as the restricting-force adjustment mechanism 30D, the configuration of the system as a whole can be simplified. In addition, the production cost for the system can be reduced.

Fourth Embodiment

Figure 9A:
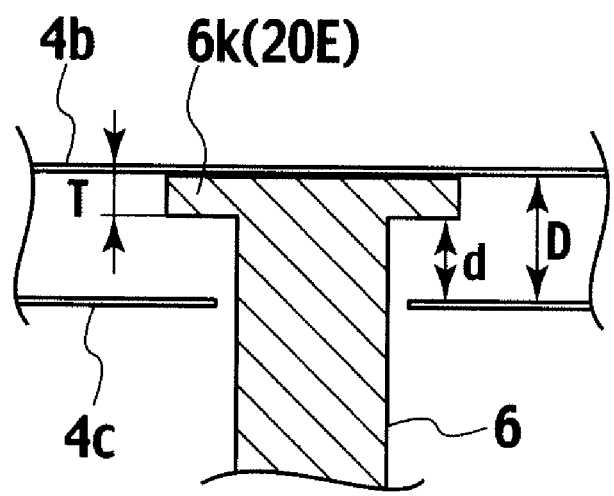
FIGS. 9A and 9B are enlarged sectional views of a hood and the leading-end portion of an actuator equipped with an oscillation-offsetting unit according to the fourth embodiment of the present invention.
Figure 9B:
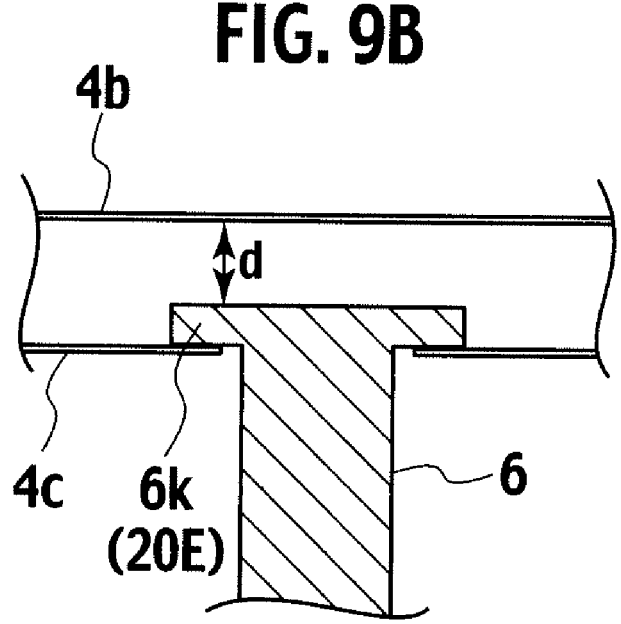

Both of FIGS. 9A and 9B illustrate a fourth embodiment of the present invention, and are enlarged sectional views of the hood 4 and the leading-end portion of the actuator 6. The hood 4 illustrated in FIG. 9A is in a state of being popped up by the upper end of the actuator 6 while the hood 4 illustrated in FIG. 9B is in a state where the movement of the hood 4 is restricted by the upper end of the actuator 6.

As FIGS. 9A and 9B show, a collar 6k is formed, as an oscillation-offsetting unit 20E, in the leading-end portion (upper-end portion) of a rod of the actuator 6 so as to extend in the radial direction. The upper-end collar 6k is not fixed onto the lower surface of the hood inner panel 4b, but is made to abut on the lower surface of the hood inner panel 4b. In addition, a stopper surface 4c is provided below the hood inner panel 4b while a certain predetermined distance D is left between the stopper surface 4c and the lower surface of the hood inner panel 4b. Here, the distance D is designed to be larger than the thickness of the collar 6k (i.e., D>T).

As has been described above, according to this fourth embodiment, when the hood 4 is popped up, the collar 6k of the actuator 6 is brought into contact with the lower surface of the hood inner panel 4b, and applies an upward pushing-up force to the hood 4 as FIG. 9A shows. By contrast, when the collar 6k is brought into contact with the stopper surface 4c, as FIG. 9B shows, the movement (rising) of the hood 4 is restricted, and thereby offsetting oscillation is produced. Accordingly, in this fourth embodiment, a preferable offsetting start time A can be set by adjusting a stroke d (=D−T).

Also according to this fourth embodiment described thus far, effective offsetting and reduction of the original oscillation of the hood 4 caused by the popping-up of the hood 4 can be achieved by use of the offsetting oscillation, as in the cases of the above-described embodiments. In addition, since the oscillation-offsetting unit 20E is disposed in the actuator 6, the configuration of the system as a whole can be made more compact.

Fifth Embodiment

Figure 10:
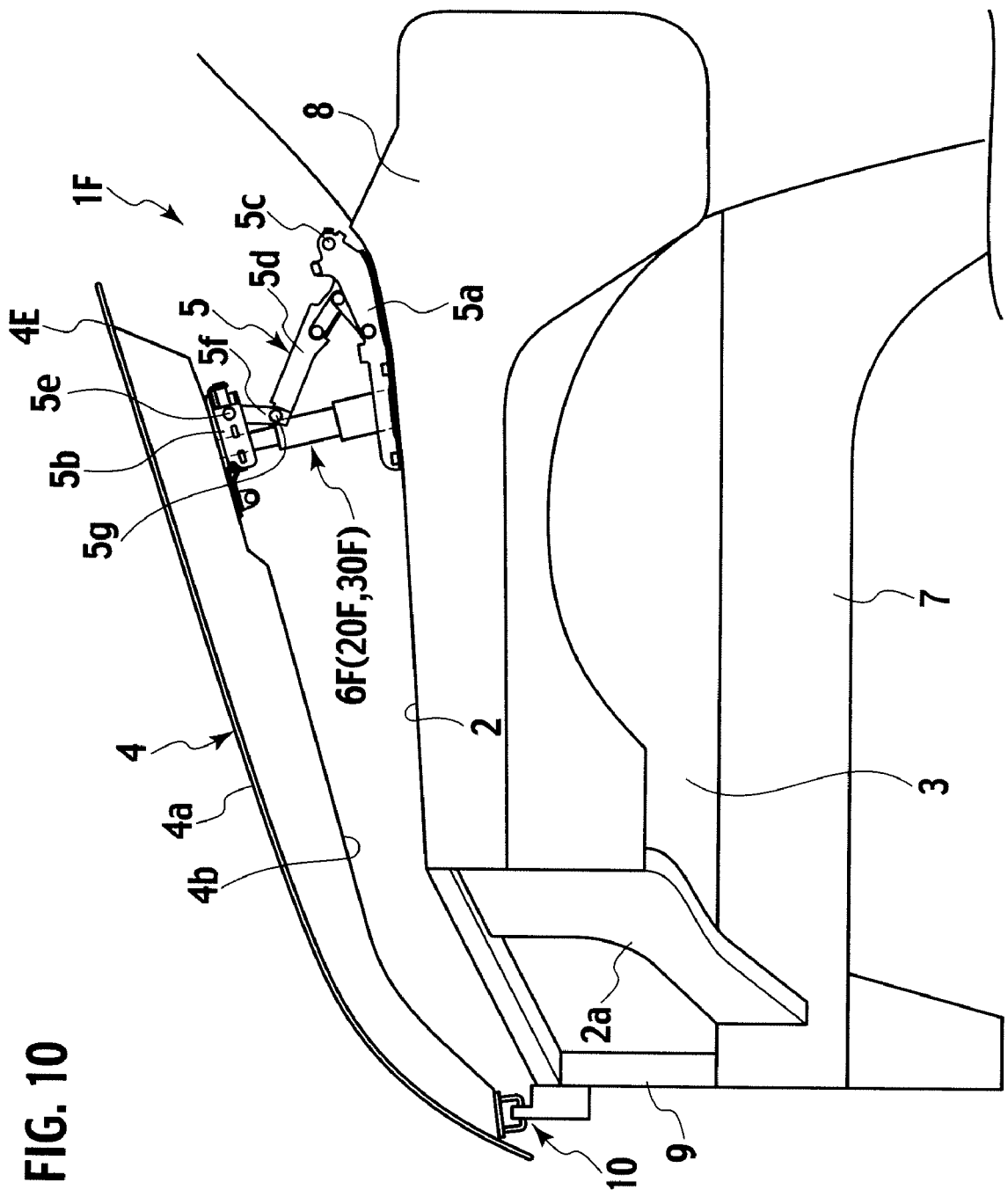
FIG. 10 is a side view (a partially sectional view) illustrating a popped-up hood in the front portion of a vehicle equipped with an oscillation-offsetting unit according to a fifth embodiment of the present invention.

FIG. 10 and FIG. 11 illustrate a fifth embodiment of the present invention. FIG. 10 is a side view (partially sectional view) of the popped-up hood 4 in the front portion of a vehicle. FIG. 11 is a sectional view illustrating an internal structure of an actuator 6F.

In this fifth embodiment, the actuator 6F disposed in a hood pop-up system 1F is provided with an oscillation-offsetting unit 20F and a restriction-force adjustment mechanism 30F.

Figure 11A:
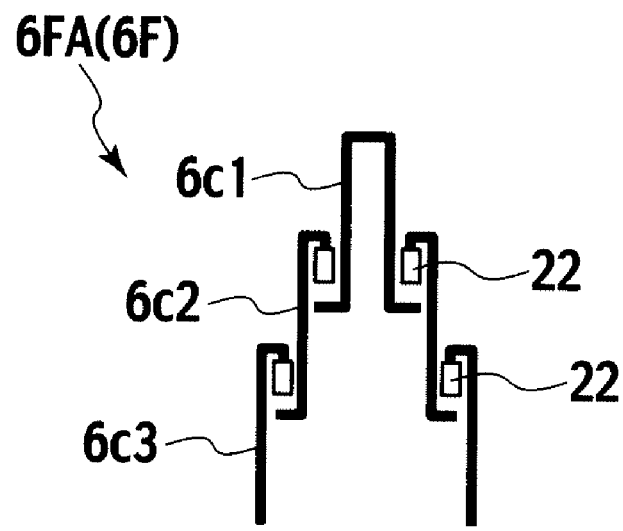
FIGS. 11A and 11B are sectional views illustrating examples of an internal structure of an actuator equipped with the oscillation-offsetting unit according to the fifth embodiment of the present invention.
Figure 11B:
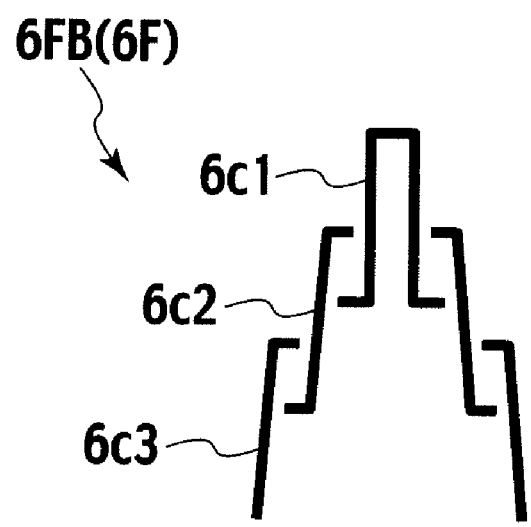

In this case, both an actuator 6FA shown in FIG. 11A and an actuator 6FB shown in FIG. 11B can be used as the actuator 6F. Each of the actuators 6FA and 6FB has a telescopic construction with cylinders 6c1, 6c2, and 6c3 . . . , each of which has a flange to restrict the extension of the actuators 6FA and 6FB, and thereby restricts the movement of the hood 4.

On the one hand, in the actuator 6FA shown in FIG. 11A, while the cylinders 6c1, 6c2, and 6c3 are formed as multi-stage cylinders, energy-absorbing materials (EA materials) 22 are set between the cylinders 6c1 and 6c2 as well as between the cylinders 6c2 and 6c3. The EA materials 22 are made to be compressed and thus deformed as the actuator 6FA is extending. In this case, the restricting force and eventually the offsetting oscillation can be adjusted by changing such conditions as whether the energy-absorbing materials 22 are provided between the corresponding cylinders or as specifications of the energy-absorbing materials 22.

On the other hand, in the actuator 6FB shown in FIG. 11B, while the cylinders 6c1, 6c2, and 6c3 . . . , are formed as multi-stage cylinders, each of the cylinders 6c1, 6c2, and 6c3 . . . is formed in a tapered shape. As the actuator 6FB is extending, a frictional force is produced between the piston of the cylinder 6c1 and the inner surface of the cylinder 6c2. In addition, another frictional force is produced between the piston of the cylinder 6c2 and the inner surface of the cylinder 6c3. In this case, the restricting force and eventually the offsetting oscillation can be adjusted by changing such conditions as the slope angle of each tapered surface or as the strokes of the pistons to slide on the inner surfaces of the corresponding cylinders.

Also according to this fifth embodiment described thus far, effective offsetting and reduction of the original oscillation of the hood 4 caused by the popping-up of the hood 4 can be achieved by use of the offsetting oscillation, as in the cases of the above-described embodiments. In addition, since the oscillation-offsetting unit 20F and restricting-force adjustment mechanism 30F are formed integrally with the actuator 6F, the configuration of the system as a whole can be made more compact.

Sixth Embodiment

Figure 12:
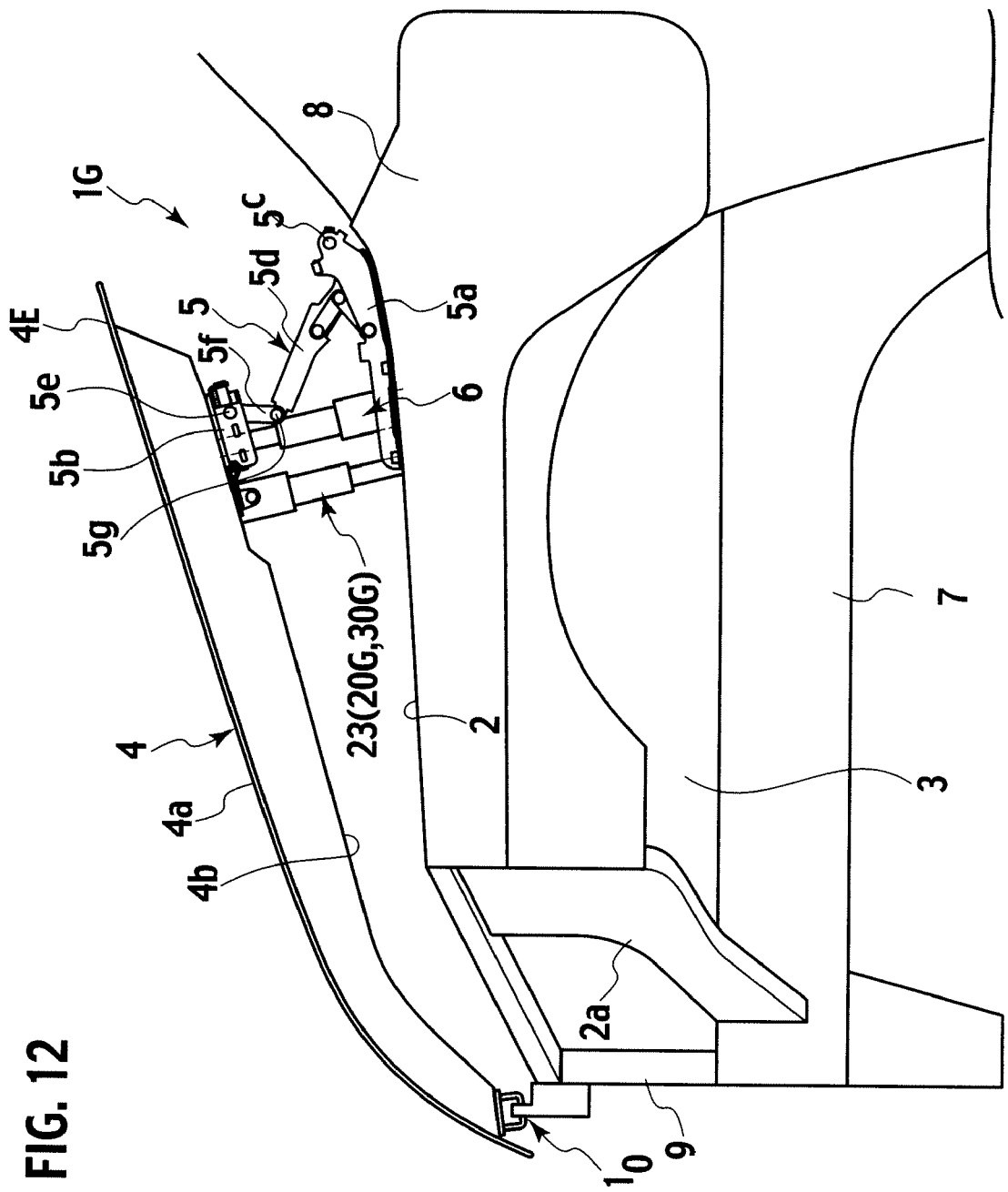
FIG. 12 is a side view (a partially sectional view) illustrating a popped-up hood in the front portion of a vehicle equipped with an oscillation offsetting unit according to a sixth embodiment of the present invention.

FIG. 12 illustrates a sixth embodiment of the present invention. FIG. 12 is a side view (partially sectional view) of the popped-up hood 4 in the front portion of a vehicle.

In this sixth embodiment, a cylinder apparatus 23 is provided to serve both as an oscillation-offsetting unit 20G and as a restricting-force adjustment mechanism 30G. The cylinder apparatus provided to this end has a similar configuration to that of the actuator 6, but is installed upside down.

The cylinder apparatus 23 is fixed both to the hood ridge member 2 and the hood inner panel 4b. In normal times, that is, when the hood 4 is closed, the cylinder apparatus 23 is shortened and is installed in the interstice between the closed hood 4 and the hood ridge member 2. The cylinder apparatus 23 is designed to extend along with the popping-up of the hood 4.

Accordingly, when the extending of the cylinder apparatus 23 is restricted, the movement of the hood 4 is also restricted. In addition, with configurations such as ones shown in FIGS.

11A and 11B, relative movement between the plural cylinders inside the cylinder 23 is made to produce a resistance. With this resistance, the restricting force exerted by the cylinder apparatus 23 on the movement of the hood 4 and eventually the offsetting oscillation of the hood 4 can be adjusted.

Various modified examples of the restricting-force adjustment mechanism will be described below with reference to FIGS. 13A to 13E and FIGS. 14A to 14D, which are views illustrating modified examples of the restricting-force adjustment mechanism.

Figure 13A:
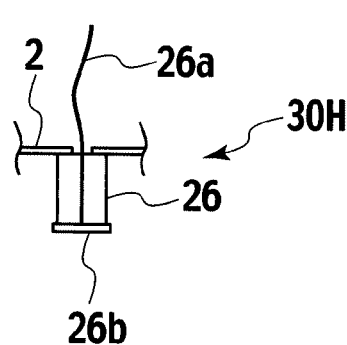
FIGS. 13A to 13E are configuration views of a restriction-force adjustment mechanism according to modified examples of the embodiments of the present invention.

A restricting-force adjustment mechanism 30H shown in FIG. 13A includes an EA (energy-absorbing) material 26. For the EA material 26, polypropylene (PP) pad formed of PP foam or the like is used. The EA material 26 is attached onto the lower surface of the hood ridge member 2. A wire 26a attached to the hood 4 is connected to a base plate 26b that covers the lower surface of the EA material 26. When the hood 4 is popped up, the wire 26a pulls upwards the base plate 26b. The pulled-up base plate 26b compresses the EA material 26, and the compression in turn is used to adjust the restricting force.

Figure 13B:
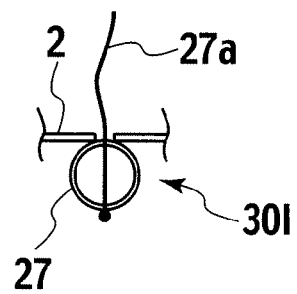

A restricting-force adjustment mechanism 30I shown in FIG. 13B includes a hollow body 27. The hollow body 27 is attached to the lower surface of the hood ridge member 2, and a wire 27a attached to the hood 4 is inserted into the hollow body 27. In addition, the wire 27a is fixed to a lower portion of the hollow body 27. While the wire 27a is pulled up by the popping-up of the hood 4, the pulled-up wire 27 crushes the hollow body 27. The crushing deformation of the hollow body 27 is used to adjust the restricting force. Note that the cross-sectional shape of the hollow body 27 is not limited to circular ones. Instead, the hollow body 27 may have rectangular cross-sectional shapes or any other polygonal shapes.

Figure 13C:
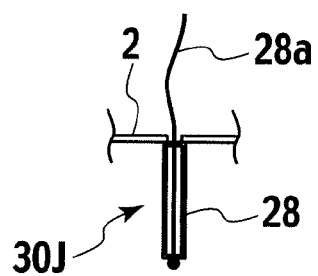

A restricting-force adjustment mechanism 30J shown in FIG. 13C includes a hollow pipe 28. The hollow pipe 28 is set upright in the vertical direction, and is attached to the lower surface of the hood ridge member 2. A wire 28a attached to the hood 4 is inserted into the inside of the hollow pipe 28. The wire 28a is fixed to the bottom surface of the hollow pipe 28. The wire 28a is pulled up by the popping-up of the hood 4, and the pulled-up wire 28a crushes the hollow pipe 28 in the axial direction thereof. The crushing deformation is in turn used to adjust the restricting force.

Figure 13D:
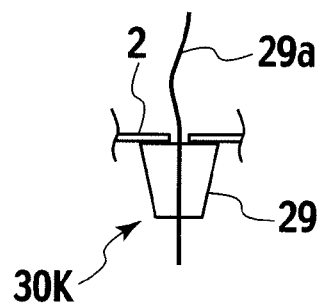

A restricting-force adjustment mechanism 30K shown in FIG. 13D includes a crush box 29 with a cross-sectional shape of an inverted trapezoid. The crush box 29 is attached to the lower surface of the hood ridge member 2. A wire 29a attached to the hood 4 is connected to the lower surface of the crush box 29. The wire 29a is pulled up by the popping-up of the hood 4, and the pulled-up wire 29a crushes the crush box 29. The crushing deformation is in turn used to adjust the restricting force.

Figure 13E:
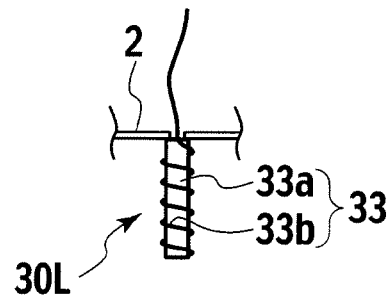

A restricting-force adjustment mechanism 30L shown in FIG. 13E includes a combination 33 of a hollow pipe 33a and a wire 33b that is wrapped around the outer side-surface of the hollow pipe 33a so as to form a spiral shape. The hollow pipe 33a is set upright in the vertical direction, and is attached to the lower surface of the hood ridge member 2. The wire 33b is attached to the hood 4. The wire 33b is pulled up by the popping-up of the hood 4, and the pulled-up wire 33b tightens up and crushes the hollow pipe 33a. The crushing deformation is in turn used to adjust the restricting force.

Needless to say, in these modified examples shown respectively in FIGS. 13A to 13E, the elastic and/or plastic deformation of the respective wires 26a, 27a, 28a, 29a, and 33b per se can also be used to adjust the restricting force.

In each of the modified examples shown in FIGS. 14A to 14D, a restricting-force adjustment mechanism either includes an elastoplastic deformation body 31 alone, which produces a resistive force by using elastic deformation and/or plastic deformation, or a combination of an elastoplastic deformation body 31 with at least one viscous drag generating body 32 that produces a resistive force by using viscous drag. Note that the elastoplastic deformation body 31 includes a wire and that the viscous drag generating body 32 includes a dashpot (i.e., a structure such as the one in the second embodiment that includes: a cylinder 20b filled with a fluid; and a piston 20a sliding inside the cylinder 20b).

Figure 14A:
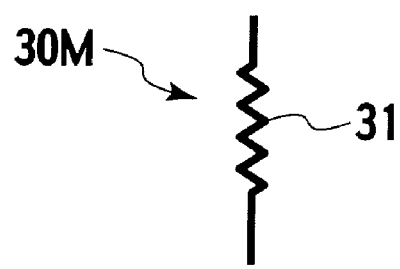
FIGS. 14A to 14D are configuration views of a restriction-force adjustment mechanism according to other modified examples of the embodiments of the present invention.

A restricting-force adjustment mechanism 30M shown in FIG. 14A includes an elastoplastic deformation body 31, but not a viscous drag generating body 32.

Figure 14B:
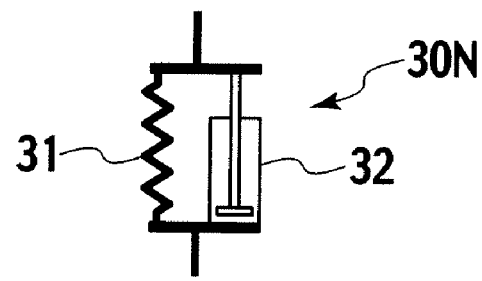

A restricting-force adjustment mechanism 30N shown in FIG. 14B includes both an elastoplastic deformation body 31 and a viscous drag generating body 32 that are arranged in parallel to each other.

Figure 14C:
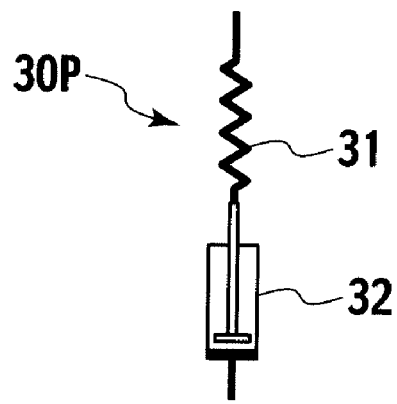

A restricting-force adjustment mechanism 30P shown in FIG. 14C includes both an elastoplastic deformation body 31 and a viscous drag generating body 32 that are arranged in line with each other.

Figure 14D:
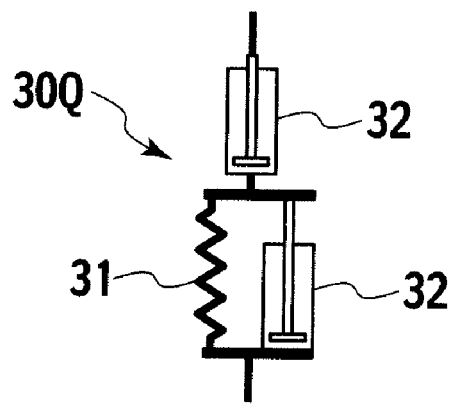

A restricting-force adjustment mechanism 30Q shown in FIG. 14D includes an elastoplastic deformation body 31 and two viscous drag generating bodies 32. One of the two viscous drag generating bodies 32 is arranged in parallel to the elastoplastic deformation body 31, and these two bodies 31 and 32 that are in parallel to each other is together arranged in line with the other one of the two viscous drag generating bodies 32.

One thing that has to be noted here is that the ways of combining the elastoplastic deformation body 31 and the viscous drag generating body 32 shown in FIGS. 14A to 14D are not the only possible examples. Various other structures with different combinations may also be employed.

Various preferred embodiments of the present invention have been described thus far, but the above-described embodiments are not the only possible modes for carrying out the present invention. Various modifications are possible. For example, vehicle-body members other than the hood ridge member or a bracket joined to the vehicle body may be used to support both the oscillation-offsetting unit and the restricting-force adjustment mechanism. In addition, an air bag or other pop-up force generating apparatus may be used as an actuator to pop up the hood. The forms of the hood hinge described in the embodiment are not the only possible forms thereof. A possible structure to be used as a hood hinge has only to be capable of being the rotational center of the rotational movement of the hood in normal times and of functioning as an apparatus for popping up the hood when a collision occurs. The present invention also includes appropriate combinations of the above-described embodiments. The scope of the invention being indicated by the claims, and all variations which come within the meaning of claims are intended to be embraced herein.

The present disclosure relates to subject matters contained in Japanese Patent Application No. 2007-211270, filed on Aug. 14, 2007, the disclosure of which is expressly incorporated herein by reference in its entirety.

What is claimed is:

1. A hood pop-up system for a vehicle that pops up a hood of the vehicle when detecting or predicting a collision of the vehicle, the hood pop-up system comprising an oscillation-offsetting unit which offsets and reduces oscillation of the hood caused by the popping-up of the hood, wherein the oscillation-offsetting unit is adapted to offset and reduce the oscillation of the hood, by applying an impact force to the hood as restricting force to give the hood an offsetting oscillation in a phase opposite to the phase of the oscillation caused by the popping-up of the hood.

2. The hood pop-up system according to claim 1, wherein the oscillation-offsetting unit produces the restricting force in a downward direction by restricting upward movement of the hood being popped-up, and wherein the oscillation-offsetting unit applies the downward restricting force to the hood at a predetermined raised position, when the hood has an upward oscillation displacement in the oscillation caused by the popping-up of the hood.

3. The hood pop-up system according to claim 1, further comprising a restricting-force adjustment mechanism that adjusts the restricting force.

4. The hood pop-up system according to claim 3, wherein the restricting-force adjustment mechanism adjusts the restricting force by making use of fluid resistance.

5. The hood pop-up system according to claim 3, wherein the restricting-force adjustment mechanism adjusts the restricting force by making use of deformation of a member of the restricting-force adjustment mechanism.

6. A hood pop-up system for a vehicle that pops up a hood of the vehicle when detecting or predicting a collision of the vehicle, the hood pop-up system comprising an oscillation-offsetting unit which offsets and reduces oscillation of the hood caused by the popping-up of the hood, wherein the oscillation-offsetting unit produces an offsetting oscillation to offset and reduce the oscillation caused by the popping-up of the hood, wherein the absolute value of an integral over a predetermined time interval of oscillation displacement of the offsetting oscillation is substantially the same as that of oscillation displacement of the oscillation caused by the popping-up of the hood.

* * * * *